US012619907B2

(12) United States Patent
Chandrahasan et al.

(10) Patent No.: US 12,619,907 B2
(45) Date of Patent: May 5, 2026

(54) AUTOMATED MODEL LINEAGE INFERENCE

(71) Applicant: International Business Machines Corporation, Armonk, NY (US)

(72) Inventors: Rajmohan Chandrahasan, Tamilnadu (IN); Kriti Rajput, Hyderabad (IN); Nitin Gupta, Saharanpur (IN); Himanshu Gupta, Vasant Kunj (IN); Sameep Mehta, Bangalore (IN); Emma Rose Tucker, Austin, TX (US); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 17/654,411

(22) Filed: Mar. 11, 2022

(65) Prior Publication Data

US 2023/0289649 A1     Sep. 14, 2023

(51) Int. Cl.
    *G06N 20/00*         (2019.01)
(52) U.S. Cl.
    CPC .................................... *G06N 20/00* (2019.01)
(58) Field of Classification Search
    None
    See application file for complete search history.

(56) References Cited

U.S. PATENT DOCUMENTS

| | | | | |
|---|---|---|---|---|
| 9,659,042 | B2 | 5/2017 | Puri et al. | |
| 10,212,054 | B2 | 2/2019 | Castro | |
| 10,521,719 | B1 * | 12/2019 | Walters | G06F 8/71 |
| 10,769,165 | B2 | 9/2020 | Simon | |
| 10,853,487 | B2 | 12/2020 | Rhee | |
| 10,990,568 | B2 * | 4/2021 | Ormont | G06N 20/00 |
| 11,205,138 | B2 * | 12/2021 | Shaikh | G06N 5/02 |
| 11,302,096 | B2 * | 4/2022 | Lohia | G06N 20/00 |
| 11,907,241 | B2 * | 2/2024 | Dunning | G06F 16/288 |
| 2016/0300156 | A1 * | 10/2016 | Bowers | G06F 16/2465 |
| 2018/0052878 | A1 | 2/2018 | Seetharaman | |
| 2020/0372398 | A1 * | 11/2020 | Shaikh | G06N 20/10 |
| 2021/0150411 | A1 | 5/2021 | Coenders | |
| 2022/0327101 | A1 * | 10/2022 | Pool | G06N 3/082 |

OTHER PUBLICATIONS

"Introduction to Vertex ML Metadata", Vertex AI|Google Cloud, accessed on Oct. 21, 2021, 3 pages, <https://cloud.google.com/vertex-ai/docs/ml-metadata/introduction>.
Bhide et al., "Generation of Machine Learning Model Lineage Events", U.S. Appl. No. 17/033,832, filed Sep. 27, 2020, 60 pages.

(Continued)

*Primary Examiner* — Maikhanh Nguyen
(74) *Attorney, Agent, or Firm* — Scott Dobson

(57) ABSTRACT

A computer-implemented method, a computer program product, and a computer system for automated model lineage inference. A computer system identifies training datasets which is used to train a machine learning model. A computer system identifies parent datasets from which the training datasets are derived. A computer system identifies associated feature transformations when the training datasets are derived from the parent datasets.

14 Claims, 6 Drawing Sheets

GIVEN TRAINING DATASETS FOR TRAINING A MACHINE LEARNING MODEL AND PARENT DATASETS FROM WHICH THE TRAINING DATASETS ARE DERIVED

DERIVE RELATIONSHIPS AND CONSTRAINTS BETWEEN COLUMNS OF THE PARENT DATASETS AND COLUMNS OF THE TRAINING DATASETS ON AN AI PLATFORM 301

IDENTIFY FEATURE TRANSFORMATIONS THAT ARE APPLIED WHEN THE TRAINING DATASETS ARE DERIVED FROM THE PARENT DATASETS, BASED ON THE RELATIONSHIPS AND CONSTRAINTS 302

VERIFY WITH AN OWNER OF THE MACHINE LEARNING MODEL 303

PUBLISH LINEAGE INFERENCE INFORMATION OF THE FEATURE TRANSFORMATIONS IN A LINEAGE STORE ON THE AI PLATFORM 304

(56)     References Cited

OTHER PUBLICATIONS

Christensen et al., "Model and data lineage in machine learning experimentation", AWS Machine Learning Blog, Sep. 21, 2021, 11 pages, <https://aws.amazon.com/blogs/machine-learning/model-and-data-lineage-in-machine-learning-experimentation/>.

Disclosed Anonymously, "System and Method to Predict Data Pattern and Lineage given the System Output and the Black-box Model", An IP.com Prior Art Database Technical Disclosure, IP.com No. IPCOM000258727D, IP.com Electronic Publication Date: Jun. 8, 2019, 5 pages.

Hofmann, Felipe Alex, "Tracer: A Machine Learning Approach to Data Lineage", Massachusetts Institute of Technology, May 2020, 79 pages.

Jang et al., "Towards Automatic Software Lineage Inference", Proceedings of the 22nd USENIX Security Symposium, Aug. 14-16, 2013 • Washington, D.C., USA, 17 pages.

Mell et al., "The NIST Definition of Cloud Computing", NIST National Institute of Standards and Technology U.S. Department of Commerce, Special Publication 800-145, Sep. 2011, 7 pages.

Schelter et al., "Automatically Tracking Metadata and Provenance of Machine Learning Experiments", Machine Learning Systems Workshop at NIPS 2017, Long Beach, CA, USA, 8 pages.

Shokri et al., "Membership Inference Attacks Against Machine Learning Models", arXiv:1610.05820v2 [cs.CR] Mar. 31, 2017, 16 pages.

Huq et al., "Probabilistic Inference of Fine-Grained Data Provenance", Database and Expert Systems Applications, Sep. 2012, pp. 296-310.

* cited by examiner

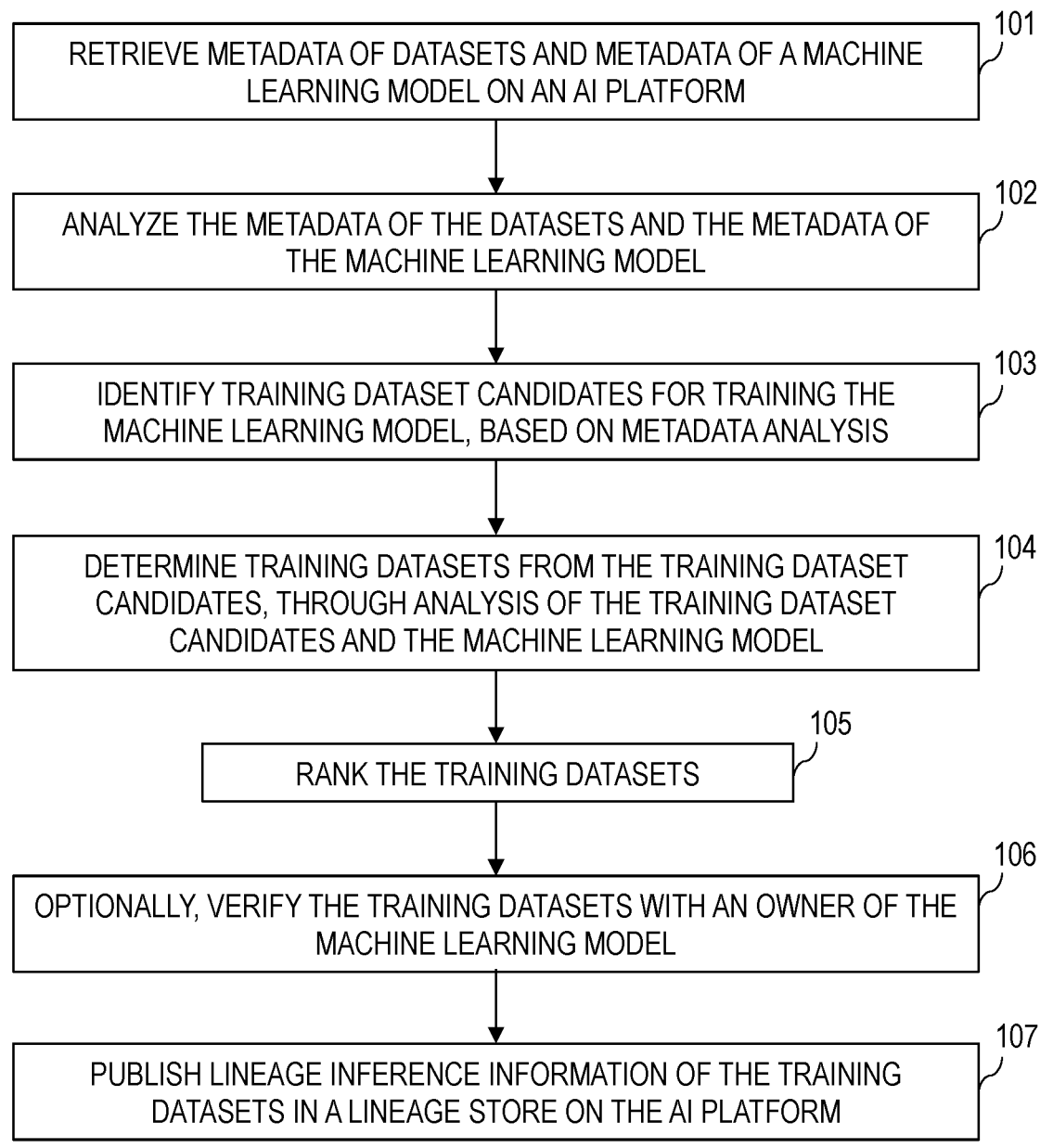

RETRIEVE METADATA OF DATASETS AND METADATA OF A MACHINE LEARNING MODEL ON AN AI PLATFORM — 101

ANALYZE THE METADATA OF THE DATASETS AND THE METADATA OF THE MACHINE LEARNING MODEL — 102

IDENTIFY TRAINING DATASET CANDIDATES FOR TRAINING THE MACHINE LEARNING MODEL, BASED ON METADATA ANALYSIS — 103

DETERMINE TRAINING DATASETS FROM THE TRAINING DATASET CANDIDATES, THROUGH ANALYSIS OF THE TRAINING DATASET CANDIDATES AND THE MACHINE LEARNING MODEL — 104

RANK THE TRAINING DATASETS — 105

OPTIONALLY, VERIFY THE TRAINING DATASETS WITH AN OWNER OF THE MACHINE LEARNING MODEL — 106

PUBLISH LINEAGE INFERENCE INFORMATION OF THE TRAINING DATASETS IN A LINEAGE STORE ON THE AI PLATFORM — 107

FIG. 1

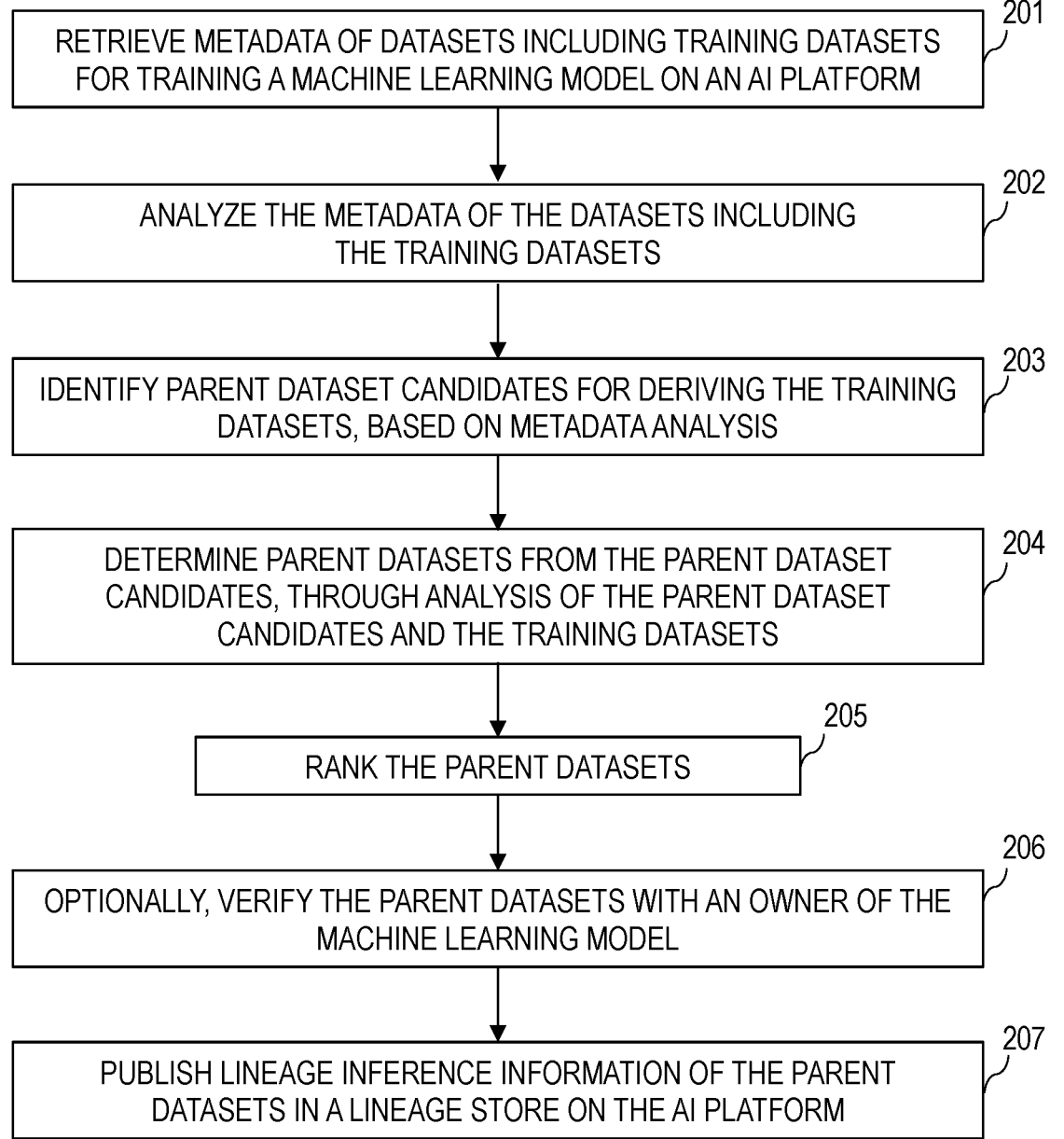

RETRIEVE METADATA OF DATASETS INCLUDING TRAINING DATASETS FOR TRAINING A MACHINE LEARNING MODEL ON AN AI PLATFORM 201

ANALYZE THE METADATA OF THE DATASETS INCLUDING THE TRAINING DATASETS 202

IDENTIFY PARENT DATASET CANDIDATES FOR DERIVING THE TRAINING DATASETS, BASED ON METADATA ANALYSIS 203

DETERMINE PARENT DATASETS FROM THE PARENT DATASET CANDIDATES, THROUGH ANALYSIS OF THE PARENT DATASET CANDIDATES AND THE TRAINING DATASETS 204

RANK THE PARENT DATASETS 205

OPTIONALLY, VERIFY THE PARENT DATASETS WITH AN OWNER OF THE MACHINE LEARNING MODEL 206

PUBLISH LINEAGE INFERENCE INFORMATION OF THE PARENT DATASETS IN A LINEAGE STORE ON THE AI PLATFORM 207

FIG. 2

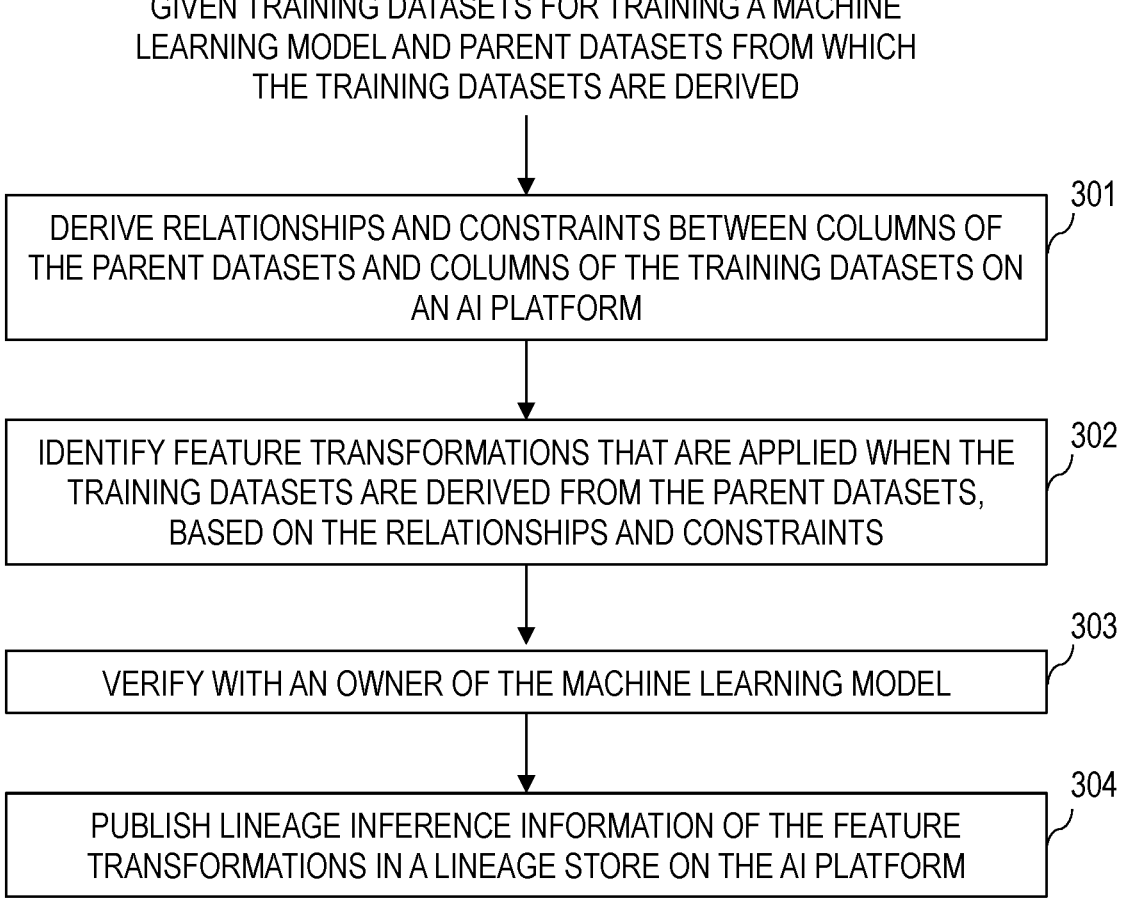

GIVEN TRAINING DATASETS FOR TRAINING A MACHINE
LEARNING MODEL AND PARENT DATASETS FROM WHICH
THE TRAINING DATASETS ARE DERIVED

DERIVE RELATIONSHIPS AND CONSTRAINTS BETWEEN COLUMNS OF
THE PARENT DATASETS AND COLUMNS OF THE TRAINING DATASETS ON
AN AI PLATFORM
301

IDENTIFY FEATURE TRANSFORMATIONS THAT ARE APPLIED WHEN THE
TRAINING DATASETS ARE DERIVED FROM THE PARENT DATASETS,
BASED ON THE RELATIONSHIPS AND CONSTRAINTS
302

VERIFY WITH AN OWNER OF THE MACHINE LEARNING MODEL
303

PUBLISH LINEAGE INFERENCE INFORMATION OF THE FEATURE
TRANSFORMATIONS IN A LINEAGE STORE ON THE AI PLATFORM
304

FIG. 3

AUTOMATED MODEL LINEAGE INFERENCE

BACKGROUND

The present invention relates generally to machine learning model lineage, and more particularly to automated model lineage inference by exploiting model and dataset metadata.

Artificial intelligence (AI) and machine learning (ML) adoption is on rise in various industries. Often AI/ML systems are built to serve the functionality first and associated lineage data is not tracked. It is critical to keep track of various events in the lifecycle of AI/ML models. This objective is served by lineage service. The lineage service keeps track of various events in the model lifecycle. Various services (such as IBM Watson Machine Learning and IBM Watson knowledge catalog) can push lineage information to lineage service. The lineage service then persists this information. The lineage services also provide options for manually ingesting lineage information. A user can manually raise lineage events on lineage service. The model lineage may cover various events, such as model training and creation, model deployment, model promotion, model version change, model quality, feature transformations on training data, etc.

SUMMARY

In one aspect, a computer-implemented method for automated model lineage inference is provided. The computer-implemented method includes retrieving metadata of datasets and metadata of a machine learning model on an artificial intelligence platform. The computer-implemented method further includes analyzing the metadata of the datasets and the metadata of the machine learning model. The computer-implemented further method includes identifying training dataset candidates for training the machine learning model, based on analysis of the metadata of the datasets and the metadata of the machine learning model. The computer-implemented method further includes determining training datasets from the training dataset candidates, through analysis of the training dataset candidates and the machine learning model. The computer-implemented method further includes ranking the training datasets, according to confidence with respect to the training datasets being used for training the machine learning model. The computer-implemented method further includes publishing lineage inference information of the training datasets in a lineage store in the artificial intelligence platform.

In another aspect, a computer-implemented method for automated model lineage inference is provided. The computer-implemented method includes retrieving metadata of datasets including training datasets for training a machine learning model on an artificial intelligence platform. The computer-implemented method further includes analyzing the metadata of the datasets including the training datasets. The computer-implemented method further includes identifying, from the datasets, parent dataset candidates for deriving the training datasets, based on analysis of the metadata of the datasets including the training datasets. The computer-implemented method further includes determining parent datasets from the parent dataset candidates, through analysis of the parent dataset candidates and the training datasets. The computer-implemented method further includes ranking the parent datasets, according to confidence with respect to the parent datasets being used for deriving the training datasets. The computer-implemented method further includes publishing lineage inference information of the parent datasets in a lineage store in the artificial intelligence platform.

In yet another aspect, a computer-implemented method for automated model lineage inference is provided. The computer-implemented method includes deriving relationships and constraints between columns of parent datasets and columns of training datasets on an artificial intelligence platform, wherein the training datasets are used for training a machine learning model on the artificial intelligence platform and the parent datasets are used for deriving the training datasets. The computer-implemented method further includes identifying feature transformations that are applied when the training datasets are derived from the parent datasets, based on the relationships and constraints. The computer-implemented method further includes publishing lineage inference information of the feature transformations in a lineage store on the artificial intelligence platform.

BRIEF DESCRIPTION OF THE SEVERAL VIEWS OF THE DRAWINGS

FIG. 1 a flowchart showing operational steps of automated model lineage inference for identifying training datasets which is used to train a machine learning model, in accordance with one embodiment of the present invention.

FIG. 2 a flowchart showing operational steps of automated model lineage inference for identifying parent datasets from which training datasets are derived, in accordance with one embodiment of the present invention.

FIG. 3 a flowchart showing operational steps of automated model lineage inference for identifying associated feature transformations when training datasets are derived from parent datasets, in accordance with one embodiment of the present invention.

DETAILED DESCRIPTION

Figure 4:
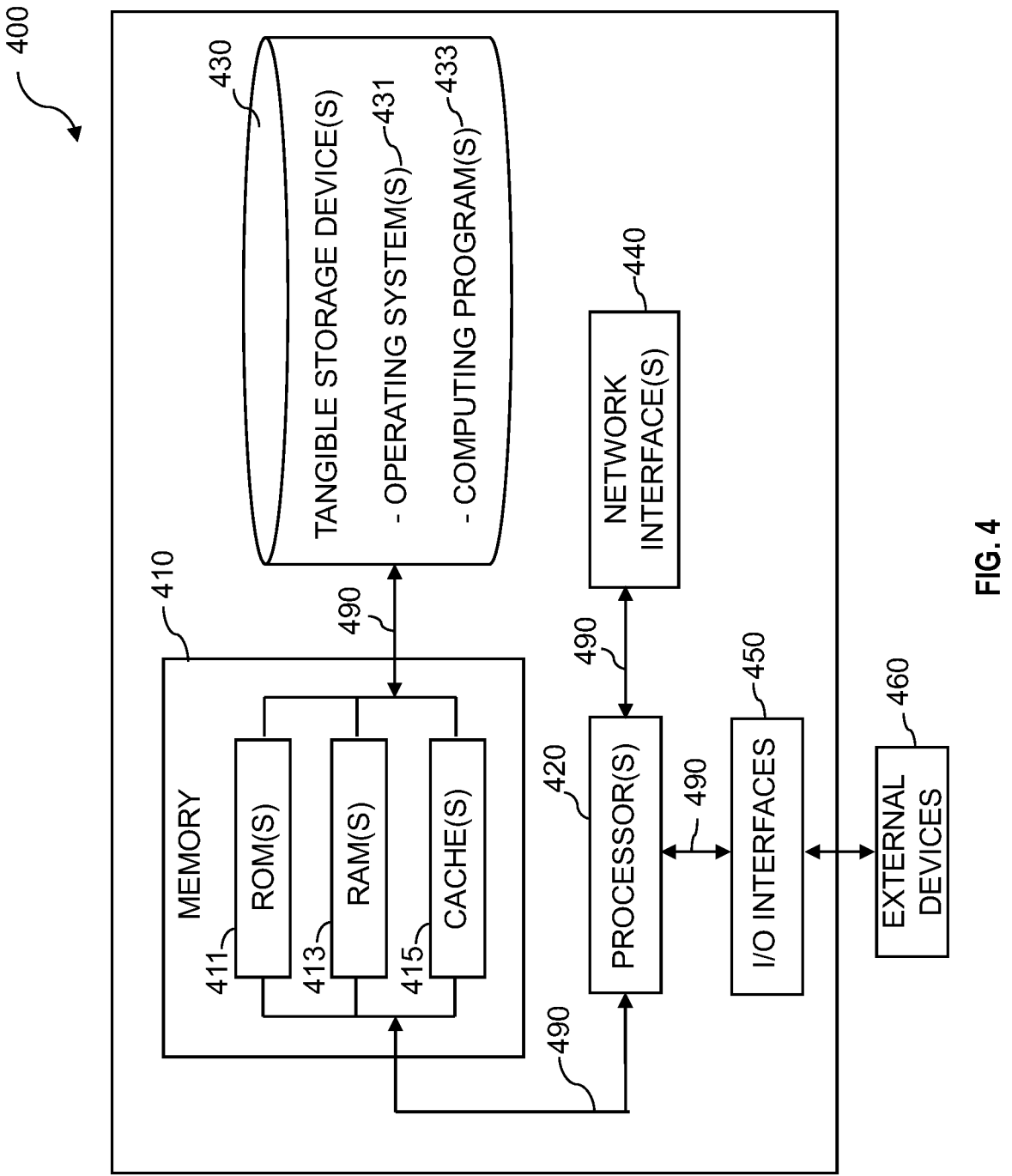
FIG. 4 is a diagram illustrating components of a computing device or server, in accordance with one embodiment of the present invention.

Embodiments of the present invention disclose an automated system for machine learning lineage inference. Automated lineage inference looks at the problem of inferring lineage information automatically, without requiring various services to raise lineage information explicitly. Considering an artificial intelligence (AI) platform which houses many artificial intelligence (AI) or machine leaning (ML) models and datasets, the automated system for machine learning lineage inference aim to find out (1) on which datasets an AI/ML model is trained, (2) from which datasets the training datasets are derived, and (3) associated feature transformations.

In embodiments of the present invention, an automated system for machine learning lineage inference analyzes metadata associated with the AI/ML models and the datasets (which are present on the AI platform) and exploits the metadata to find out a short list in which training dataset candidates for an AI/ML model are ranked. If the confidence of the top-k training dataset candidates are very high, the information of machine learning lineage inference is persisted in a lineage store (which is marked as inferred).

In embodiments of the present invention, an automated system for machine learning lineage inference analyzes metadata associated with the AI/ML models and the training datasets (which are present on the AI platform). An automated system for machine learning lineage inference exploits the metadata to find out a short list in which parent dataset candidates of the training data are ranked. Parent datasets are datasets from which the training datasets are derived. Information of machine learning lineage inference for the top candidate parent datasets based on confidence is persisted in a lineage store.

In embodiments of the present invention, an automated system for machine learning lineage inference analyzes metadata associated with the AI/ML models and the parent datasets (which are present on the AI platform). An automated system for machine learning lineage inference exploits the metadata to find out whether feature transformations are applied when training datasets are derived from the parent datasets, and further what feature transformations are applied. Information of machine learning lineage inference for the feature transformations is persisted in a lineage store.

In embodiments of the present invention, an automated system for machine learning lineage inference is implemented on one or more computing devices or servers. A computing device or server is described in more detail in later paragraphs with reference to FIG. 4. An automated system for machine learning lineage inference may be implemented in a cloud computing environment. The cloud computing environment is described in more detail in later paragraphs with reference to FIG. 5 and FIG. 6.

FIG. 1 a flowchart showing operational steps of automated model lineage inference for identifying training datasets which is used to train a machine learning model, in accordance with one embodiment of the present invention. The operational steps are implemented by an automated system for machine learning lineage inference; the automated system is implemented on one or more computing devices or servers.

At step 101, the one or more computing devices or servers retrieve metadata of datasets and metadata of a machine learning model on an artificial intelligence (AI) platform. After retrieving the metadata of the datasets and the metadata of the machine learning model, the one or more computing devices or servers whittle down a set of potential datasets for training the machine learning model, by applying a set of heuristics. On the AI platform, any machine learning activity is done within a restricted project space; for example, on IBM Watson Knowledge Catalog, a project is a workspace with only a restricted set of users having access to the project. The potential datasets for training the machine learning model are generally in a same project; therefore, for the machine learning model, the one or more computing devices or servers can restrict the datasets in a same project of training the specific machine learning model. Thus, the search space is significantly pruned.

At step 102, the one or more computing devices or servers analyze the metadata of the datasets and the metadata of the machine learning model. The one or more computing devices or servers compare a schema of the machine learning model and schemas of the datasets. Often, the schema of the machine learning model and the schemas of the datasets contain the same column names. The schemas of the datasets are often supersets of the schema of the machine learning model. Also, from an output schema of the machine learning model, the one or more computing devices or servers may find the names of the columns describing class labels. The datasets may include such label columns. Sometimes, data scientists may rename a column in the schema of the machine learning model. However, a name of the renamed column may still be similar to column names used in the datasets. Therefore, the one or more computing devices or servers compare the similarity between column names in the machine learning model input schema and column names in the datasets. In comparing the schema of the machine learning model and the schemas of the datasets, the one or more computing devices or servers also match types of columns in the machine learning model input schema and the datasets; for example, if an input schema of the machine learning model contains 5 string and 3 integer columns, the datasets must contain at least as many string and integer columns. In addition, the one or more computing devices or servers compare names and descriptions of the datasets with the name and the description of the machine learning model.

At step 103, the one or more computing devices or servers identify training dataset candidates for training the machine learning model, based on metadata analysis (based on metadata analysis at step 102). For example, AutoAI/SPSS flows store information of all attributes, such as feature manipulations, feature selections, model selections, etc. in the pipeline. AutoAI is a variation of automated machine learning (AutoML); AutoML is the process of automating the manual tasks that data scientists must complete as they build and train machine learning models. SPSS Modeler is a visual data science and ML solution used for data preparation and discovery, predictive analytics, model management and deployment in AI platforms. Therefore, the one or more computing devices or servers can parse the model metadata as well as the AutoAI/SPSS pipeline metadata. The one or more computing devices or servers obtain attributes that the AutoAI/SPSS pipeline consumed. The one or more computing devices or servers use the information to shortlist a set of datasets which are used to train the machine learning model.

At step 104, the one or more computing devices or servers determine training datasets from the training dataset candidates, through analysis of the training dataset candidates and the machine learning model. The one or more computing devices or servers may further narrow down which datasets may be training datasets, by applying further analysis based on specific model types such as neural network, decision tree, or support vector machine. In addition, the one or more computing devices or servers may determine the training datasets by applying a method which determines whether a sample point is in the training datasets or not.

With the neural network based model, for each training dataset candidate, the one or more computing devices or servers start a new training run of the machine learning model from the current (trained) state. The current state means the one or more computing devices or servers do not start a run from any initial or random position. The one or more computing devices or servers start a new run, from the trained state of the machine learning model, as present on the platform. If the machine learning model is trained on a dataset, the weights generally do not change much in such a retraining process. The dataset on which the weights change the least is likely to be a training dataset.

With the decision tree based model, the one or more computing devices or servers analyze the conditions present in the machine learning model and match them with the content of the datasets. For example, a categorized feature may contain three values in a first dataset (e.g., "low", "medium", and "high") while the same feature may contain five values in a second dataset (e.g., "very low", "low", "medium", "high", and "very high"). If the decision tree contains conditions which are using category-values "very low" or "very high" for example, this implies that the machine learning model is trained on the second dataset.

With the support vector machine (SVM), the one or more computing devices or servers extract support vectors from a SVM model and check whether those samples exist in datasets or not. Support vectors are points from datasets which help in influencing the decision boundary.

At step 105, the one or more computing devices or servers rank the training datasets. Through step 104, the one or more computing devices or servers obtain a list of top training dataset candidates as the training datasets. Based on the analysis (which is described in previous paragraphs) of the training dataset candidates and the machine learning model, the one or more computing devices or servers rank the training datasets in the list. The parent datasets stayed in the list are ranked according to confidence with respect to the training datasets being used for training the machine learning model.

At step 106, optionally, the one or more computing devices or servers verify the training datasets (or top training dataset candidates) with an owner of the machine learning model. The one or more computing devices or servers verify on whether the training datasets are used for training the machine learning model. Whether the one or more computing devices or servers verify with the owner depends on the confidence; for example, if the confidence is high, the verification may not be needed.

At step 107, the one or more computing devices or servers publish lineage inference information of the training datasets in a lineage store on the AI platform. The lineage inference information is published in the lineage store for persistence and it can be then used for presentation or reporting later in the lineage services in the AI platform.

FIG. 2 a flowchart showing operational steps of automated model lineage inference for identifying parent datasets from which the training datasets are derived, in accordance with one embodiment of the present invention. The operational steps are implemented by an automated system for machine learning lineage inference; the automated system is implemented on one or more computing devices or servers.

Once the one or more computing devices or servers have identified the training datasets for training the machine learning model, the one or more computing devices or servers will identify from which parent datasets the training datasets are derived.

At step 201, the one or more computing devices or servers retrieve metadata of datasets including training datasets for training a machine learning model on an artificial intelligence (AI) platform. The training datasets are identified from the datasets, through the operational steps shown in FIG. 1.

At step 202, the one or more computing devices or servers analyze the metadata of the datasets including the training datasets. The one or more computing devices or servers compare schemas, names, descriptions of the datasets to find similar datasets.

In analyzing the metadata, the one or more computing devices or servers examine whether the number of tuples (in training datasets and its parent datasets) are identical or very close. Often, the number of tuples in training datasets and its parent datasets are identical or very close in a case where some tuples are dropped for data-cleaning or pre-processing purposes.

In analyzing the metadata, the one or more computing devices or servers examine whether class label columns are identical. Class label columns in training datasets and its parent datasets are generally identical. In analyzing the metadata, the one or more computing devices or servers examine whether distributions of values in class label columns are identical or very close. Distributions of values in class label columns in training datasets and its parent datasets are generally identical or very close.

In analyzing the metadata, the one or more computing devices or servers examine whether there are any common columns between training datasets and candidate parent datasets. Common columns in training datasets and its parent datasets are generally identical or very similar. In analyzing the metadata, the one or more computing devices or servers examine whether distribution of values in common columns in training datasets and its parent datasets are identical or very close. Distribution of values in common columns in training datasets and its parent datasets are supposed to be identical or very close.

Datasets can be often transformed via tools such as data-stage, data-refinery flows, etc. These workflows also are present in the same project. Hence, in analyzing the metadata, the one or more computing devices or servers compare dataset names, schemas, descriptions with the metadata associated with the data-stage and/or data-refinery workflows, etc.

At step 203, the one or more computing devices or servers identify parent dataset candidates for deriving the training datasets, based on metadata analysis conducted at step 202. At step 204, the one or more computing devices or servers determine parent datasets from the parent dataset candidates, through analysis of the parent dataset candidates and the training dataset. A list of the parent dataset candidates identified at step 203 is pruned down to select the parent datasets from the parent dataset candidates.

At step 205, the one or more computing devices or servers rank the parent datasets (which are determined at step 204). The parent datasets stayed in the list are ranked according to confidence with respect to the training datasets being derived from the parent datasets.

At step 206, optionally, the one or more computing devices or servers verify the parent datasets with an owner of the machine learning model. The one or more computing devices or servers verify on whether the training datasets are derived from the parent datasets. Whether the one or more computing devices or servers verify with the owner depends on the confidence; for example, if the confidence is high, the verification may not be needed.

At step 207, the one or more computing devices or servers publish lineage inference information of the parent datasets in a lineage store on the AI platform. The lineage inference information of the parent datasets is published in the lineage store for persistence and it can be then used for presentation or reporting later in the lineage services in the AI platform.

FIG. 3 a flowchart showing operational steps of automated model lineage inference for identifying associated feature transformations when a dataset is derived from another dataset, in accordance with one embodiment of the present invention. The operational steps are implemented by an automated system for machine learning lineage inference; the automated system is implemented on one or more computing devices or servers.

The one or more computing devices or servers will find out whether a training dataset is derived from a parent datasets by applying a feature transformation. If a training dataset is derived from a parent datasets by applying a feature transformation, one or more computing devices or servers will determine what feature transformation is applied. It is assumed that only one feature transformation is applied on one column of the training dataset.

At step 301, given the training datasets (which are identified through steps shown in FIG. 1) and the parent datasets (which are identified through steps shown in FIG. 2), the one or more computing devices or servers derive relationships and constraints between columns of the parent datasets and columns of the training datasets on an artificial intelligence platform. In identifying associated feature transformations, the one or more computing devices or servers limit the scope of the relationships and constraints to popular feature transformations applied in machine learning. For example, some popular feature transformations are as follows: 'sqrt', 'log', 'round', 'cbrt', 'sin', 'cos', 'tan', 'abs', 'sigmoid', 'max', 'diff', 'sum', 'divide', 'stdscaler', and 'minmaxscaler'.

At step 302, the one or more computing devices or servers identify feature transformations that are applied when the training datasets are derived from the parent datasets, based on the relationships and constraints. At step 303, optionally, the one or more computing devices or servers verify with an owner of the machine learning model. The one or more computing devices or servers verify on whether the feature transformations are applied when the training datasets are derived from the parent datasets. At step 304, the one or more computing devices or servers publish lineage inference information of the feature transformations in a lineage store on the artificial intelligence platform.

FIG. 4 is a diagram illustrating components of computing device or server 400, in accordance with one embodiment of the present invention. It should be appreciated that FIG. 4 provides only an illustration of one implementation and does not imply any limitations; different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 330.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
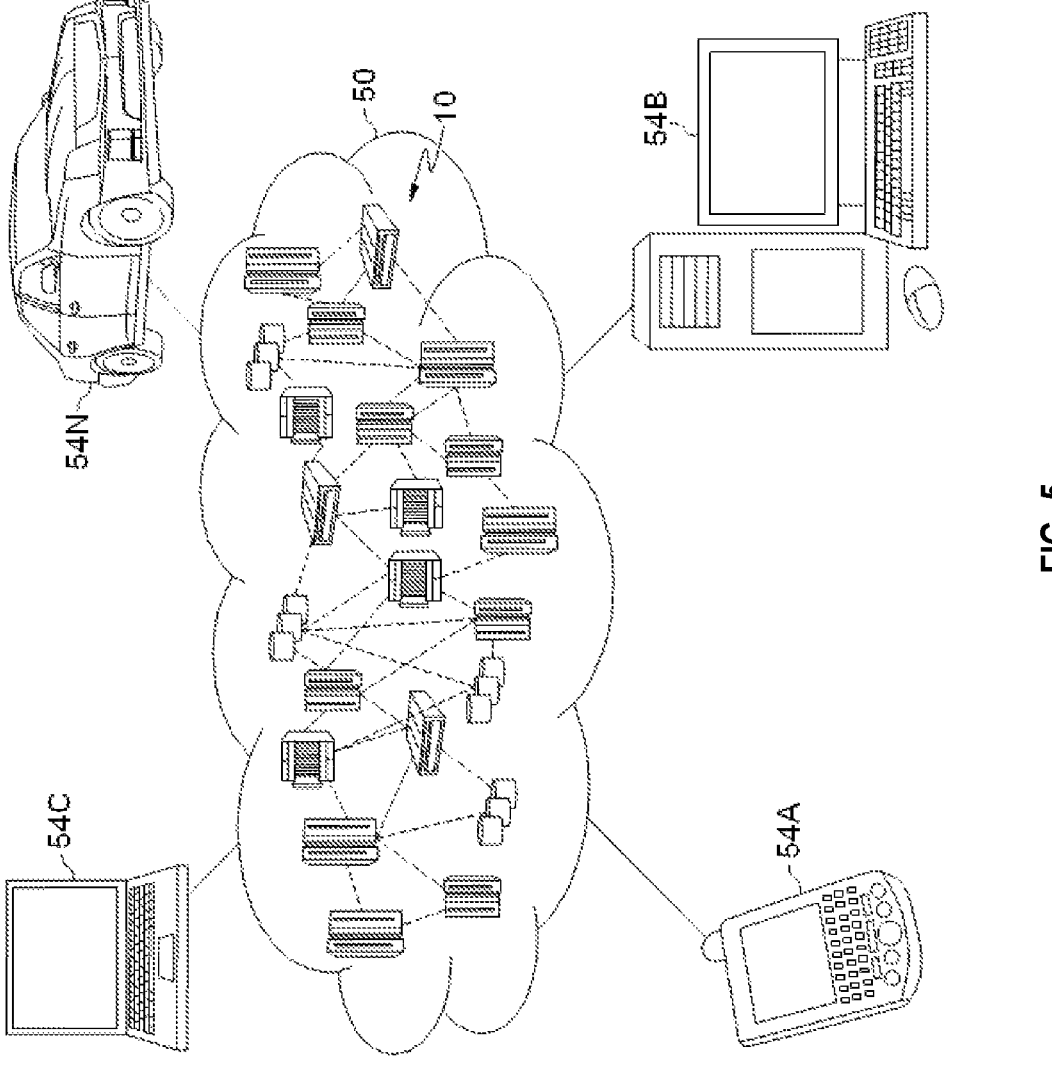
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
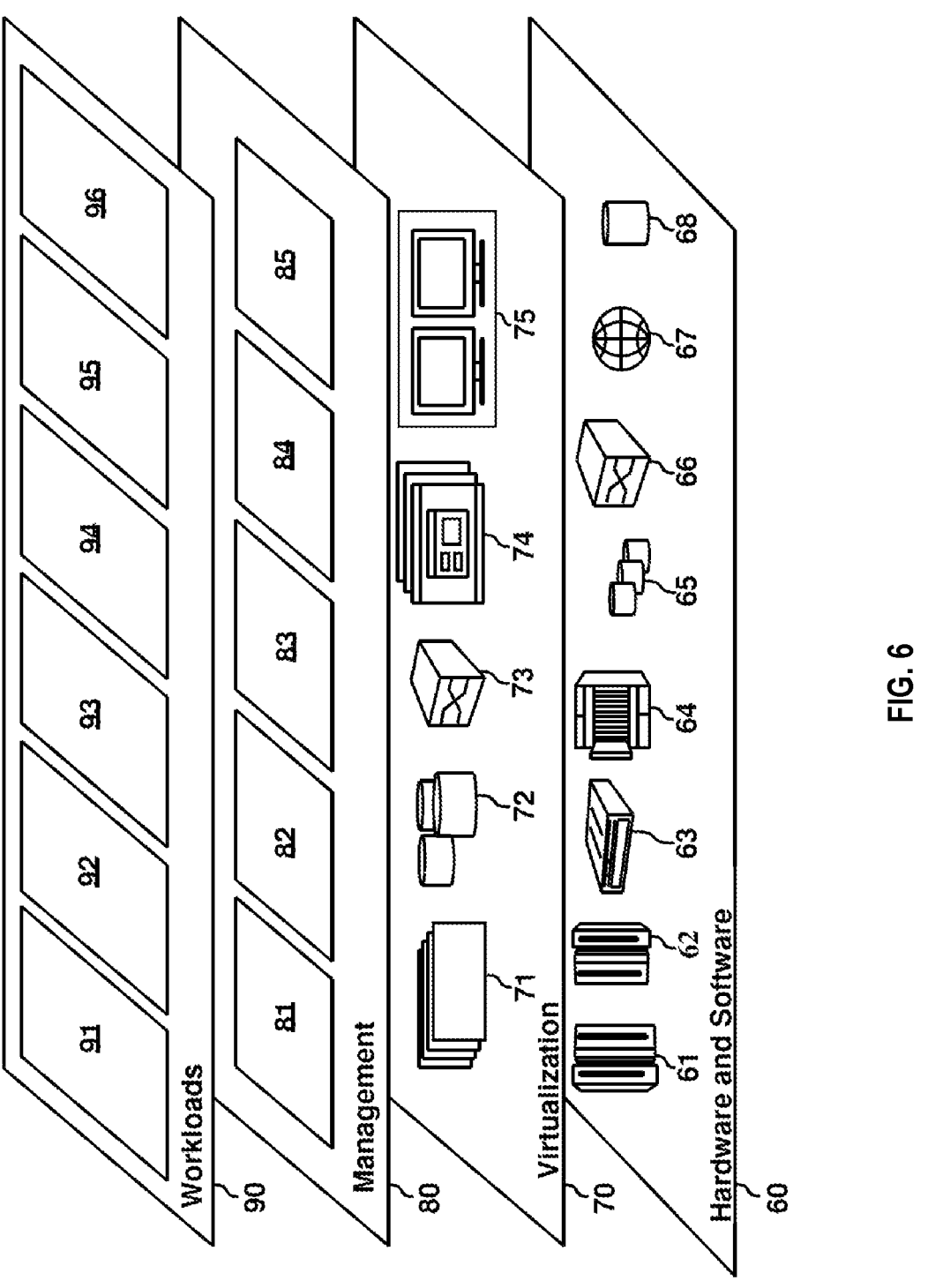
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of automated model lineage inference by exploiting model and dataset metadata.

What is claimed is:

1. A computer-implemented method for automated model lineage inference, the method comprising:

retrieving metadata of datasets and metadata of a machine learning model on an artificial intelligence platform;

analyzing the metadata of the datasets and the metadata of the machine learning model;

identifying training dataset candidates for training the machine learning model, based on analysis of the metadata of the datasets and the metadata of the machine learning model;

determining training datasets from the training dataset candidates, through analysis of the training dataset candidates and the machine learning model;

ranking the training datasets, according to confidence with respect to the training datasets being used for training the machine learning model;

publishing lineage inference information of the training datasets in a lineage store in the artificial intelligence platform;

retrieving metadata of the training datasets on the artificial intelligence platform;

analyzing the metadata of the training datasets;

identifying parent dataset candidates for deriving the training datasets, based on analysis of the metadata of the training datasets;

determining parent datasets from the parent dataset candidates, through analysis of the parent dataset candidates and the training dataset;

ranking the parent datasets, according to confidence with respect to the parent datasets being used for deriving the training datasets; and publishing lineage inference information of the parent datasets in the lineage store in the artificial intelligence platform.

2. The computer-implemented method of claim 1, further comprising:

verifying, with an owner of the machine learning model, whether the training datasets are used for training the machine learning model.

3. The computer-implemented method of claim 1, further comprising:

deriving relationships and constraints between columns of the parent datasets and columns of the training datasets;

identifying feature transformations that are applied when the training datasets are derived from the parent datasets, based on the relationships and constraints; and

publishing lineage inference information of the feature transformations in the lineage store in the artificial intelligence platform.

4. The computer-implemented method of claim 1, further comprising:

comparing schemas of the datasets and a schema of the machine learning model.

5. The computer-implemented method of claim 1, further comprising:

comparing similarity between column names in the machine learning model and column names in the datasets.

6. The computer-implemented method of claim 1, further comprising:

comparing names and descriptions of the datasets with a name and a description of the machine learning model.

7. The computer-implemented method of claim 1, further comprising:

for determining the training datasets from the training dataset candidates, applying one of a neural network, a decision tree, and a support vector machine.

8. The method of claim 1, wherein determining training datasets from the training dataset candidates comprises:

training the machine learning model using each of the training dataset candidates; and determining the training datasets based on comparing weights of the machine learning model prior to the training using a given training dataset candidate to the weights of the model after the training using the given training dataset candidate, wherein the training datasets are associated with a smaller change in weights of the machine learning model relative to other datasets from the training dataset candidates.

9. A computer-implemented method for automated model lineage inference, the method comprising:

retrieving metadata of datasets including training datasets for training a machine learning model on an artificial intelligence platform;

analyzing the metadata of the datasets including the training datasets;

identifying, from the datasets, parent dataset candidates for deriving the training datasets, based on analysis of the metadata of the datasets including the training datasets;

determining parent datasets from the parent dataset candidates, through analysis of the parent dataset candidates and the training datasets;

ranking the parent datasets, according to confidence with respect to the parent datasets being used for deriving the training datasets;

publishing lineage inference information of the parent datasets in a lineage store in the artificial intelligence platform;

retrieving the metadata of the datasets and metadata of the machine learning model on the artificial intelligence platform;

analyzing the metadata of the datasets and the metadata of the machine learning model;

identifying training dataset candidates for training the machine learning model, based on analysis of the metadata of the datasets and the metadata of the machine learning model;

determining the training datasets from the training dataset candidates, through analysis of the training dataset candidates and the machine learning model;

ranking the training datasets, according to confidence with respect to the training datasets being used for training the machine learning model; and publishing lineage inference information of the training datasets in the lineage store in the artificial intelligence platform.

10. The computer-implemented method of claim 9, further comprising:

verifying, with an owner of the machine learning model, whether the parent datasets are used for deriving the training datasets.

11. The computer-implemented method of claim 9, further comprising:

deriving relationships and constraints between columns of the parent datasets and columns of the training datasets;

identifying feature transformations that are applied when the training datasets are derived from the parent datasets, based on the relationships and constraints; and publishing lineage inference information of the feature transformations in the lineage store in the artificial intelligence platform.

12. A computer-implemented method for automated model lineage inference, the method comprising:

deriving relationships and constraints between columns of parent datasets and columns of training datasets on an artificial intelligence platform, wherein the training datasets are used for training a machine learning model on the artificial intelligence platform and the parent datasets are used for deriving the training datasets;

identifying feature transformations that are applied when the training datasets are derived from the parent datasets, based on the relationships and constraints;

publishing lineage inference information of the feature transformations in a lineage store on the artificial intelligence platform;

retrieving metadata of the datasets including the training datasets on the artificial intelligence platform;

analyzing the metadata of the datasets including the training datasets;

identifying parent dataset candidates for deriving the training datasets, based on analysis of the metadata of the datasets including the training datasets;

determining the parent datasets from the parent dataset candidates, through analysis of the parent dataset candidates and the training dataset;

ranking the parent datasets, according to confidence with respect to the parent datasets being used for deriving the training datasets; and publishing lineage inference information of the parent datasets in the lineage store in the artificial intelligence platform.

13. The computer-implemented method of claim 12, further comprising:

verifying, with an owner of the machine learning model, whether the training datasets are derived from the parent datasets.

14. The computer-implemented method of claim 12, further comprising:

retrieving metadata of datasets and metadata of the machine learning model on the artificial intelligence platform;

analyzing the metadata of the datasets and the metadata of the machine learning model;

identifying training dataset candidates for training the machine learning model, based on analysis of the metadata of the datasets and the metadata of the machine learning model;

determining the training datasets from the training dataset candidates, through analysis of the training dataset candidates and the machine learning model;

ranking the training datasets, according to confidence with respect to the training datasets being used for training the machine learning model; and publishing lineage inference information of the training datasets in the lineage store in the artificial intelligence platform.

* * * * *